United States Patent [19]

Mansson et al.

[11] Patent Number: 5,429,838
[45] Date of Patent: Jul. 4, 1995

[54] METHOD FOR THE PRODUCTION OF INTRAOCULAR LENSES

[75] Inventors: Per Månsson, Sollentuna, Sweden; Johannes Hermans, Bedum, Netherlands

[73] Assignee: Pharmacia AB, Uppsala, Sweden

[21] Appl. No.: 131,851

[22] Filed: Oct. 5, 1993

[30] Foreign Application Priority Data

Oct. 7, 1992 [SE] Sweden ................... 9202925

[51] Int. Cl.$^6$ .................... A61F 2/16; A61F 2/14; B29D 11/02
[52] U.S. Cl. ................... 427/2.24; 427/155; 427/242; 427/289; 427/272
[58] Field of Search .......... 427/2, 155, 164, 242, 427/272, 289, 224, 336, 532

[56] References Cited

U.S. PATENT DOCUMENTS

| 364,324 | 6/1887 | Weis | 427/289 |
|---|---|---|---|
| 1,449,962 | 3/1923 | Wells | 427/272 |
| 2,245,218 | 6/1941 | Murray, Jr. et al. | 427/164 |
| 4,267,208 | 5/1981 | Ireland | 427/155 |
| 4,273,809 | 6/1981 | LaLiberte et al. | 427/155 |
| 4,534,069 | 8/1985 | Kelman | 623/6 |
| 4,580,371 | 4/1986 | Akhavi | 51/313 |
| 4,666,249 | 5/1987 | Bauman et al. | 264/1.7 |
| 4,718,905 | 1/1988 | Freeman | 623/6 |
| 4,731,080 | 3/1988 | Galin |  |
| 4,847,020 | 7/1989 | Akhavi | 264/2.7 |
| 4,946,716 | 8/1990 | Corrie | 427/289 |
| 5,008,102 | 4/1991 | York | 427/2 |
| 5,051,312 | 9/1991 | Allmér | 427/2 |
| 5,246,728 | 9/1993 | Rodriquez | 427/498 |
| 5,258,024 | 11/1993 | Chavel et al. | 427/2 |
| 5,258,098 | 11/1993 | Wagner et al. | 427/289 |
| 5,260,093 | 11/1993 | Kamel et al. | 427/22.4 |
| 5,296,305 | 3/1994 | Baude et al. | 427/164 |

FOREIGN PATENT DOCUMENTS

7900326A1 6/1979 WIPO .
8505317A1 12/1985 WIPO .
8808287A1 11/1988 WIPO .

Primary Examiner—Diana Dudash
Attorney, Agent, or Firm—Lowe, Price, LeBlanc & Becker

[57] ABSTRACT

In a method for producing intraocular lenses with improved optical properties, applying to the optical part of the lens a coating to protect the surface during one or more processing steps which are carried out under conditions so that the protective coating is essentially insoluble and remains adhered to the lens, and removing the coating by changing the conditions which make the coating adhere to the lens.

6 Claims, No Drawings

METHOD FOR THE PRODUCTION OF INTRAOCULAR LENSES

The present invention is related to the manufacture of intraocular lenses and to a method of special advantage when used in connection with diffractive intraocular lenses having a complex surface structure which is sensitive to the surface finishing methods normally used in intraocular lens production.

The use of synthetic intraocular lenses for replacing the natural lens in the eye has become a very convenient way for the treatment of various conditions when the natural lens does not function appropriately, for instance when the eye is mechanically damaged or in various cases of cataract when the lens becomes opaque, resulting in serious loss of vision. This is a rather common condition, especially among elderly people.

An intraocular lens consists of an optical part and haptics or loops which, depending on the type of surgery carried out, will anchor the lens in the eye, for instance in the capsular bag, and keep the optical part in a correct position after implantation. The optical part is prepared from a transparent material and usually has the form of a circular lens with a diameter of about 4 to 8 mm. The material is often acrylate, especially poly(methylmethacrylate) (PMMA), polycarbonate, silicone or a hydrogel. The haptics, loops or legs which they sometimes are called, can be made of a different material, for instance polypropylene, and are attached via drilled holes to the optical part, or be made of the same material as the optical part. In this latter case the lens is often manufactured in one-piece from a sheet of lens material and the haptics are formed integrally with the optical part. The manufacture of a lens involves several steps for forming the appropriate optical properties and the appropriate loop configuration. These steps are carried out by the use of techniques such as compression moulding, lathe cutting, laser cutting, drilling, etc. Even if it is possible to produce a great variety of intraocular lenses by using these procedures, some of them have the drawback of giving rise to sharp edges and other irregularities on the optical as well as the haptic parts. Such irregularities on the lens surface may after implantation induce inflammatory responses and mechanical trauma in the eye. It is therefore important that the manufacturing method involves steps for obtaining a very smooth lens surface. The procedures normally utilized comprise tumbling the lenses in a slurry containing a mixture of various polishing agents. The purpose of the process is to remove excess material from the lens surface, but unfortunately the optical part of the lens is also affected and the erosion of material from the optical part results in a hazy appearance, which is visible upon careful ocular inspection. The optical properties are, however, in spite of the affected lens surface, in most cases quite acceptable and it is assumed that a considerable number of the lenses on the market today have been polished by such a tumbling method. There would therefore be an advantage in using post forming methods which do not cause any modification of the optical part of the lens.

Bi- and multifocal lenses have for some years met a growing interest by ophthalmologist as well as producers of intraocular lenses. These types of lenses are designed to give two or more focal points and have in common a more complex optical body. One way of obtaining such properties is by designing the optical part to have circular zones, some of them having one focal point while the others give another focal point (see for instance European Patent Application 140063). Zones of this type are characterized by the zone width, their curvature and in some cases also the height of a more or less pronounced step. The complexity of bi- and multifocal lenses is especially pronounced in connection with intraocular lenses exhibiting besides refractive power also diffractive properties. One example of such a lens is disclosed in U.S. Pat. No. 4,642,112 and is characterized by having basic refractive power providing one focus and having a diffractive power shift which deviates some light from the basic refractive power focus to another focus.

For obtaining the diffractive properties the optical part of the lens surface has a superimposed grating structure. Parameters such as groove depth and groove spacing to groove depth ratio are important when defining the diffractive power shift of the lens. We have now found that when a lens of this type, having also diffractive properties, is tumbled the diffractive contribution to the distribution of light is adversely affected giving a product with considerably reduced optical quality since the diffractive pattern of the lens surface is eroded during the tumbling/polishing process.

The general need for improved surface polishing methods in connection with the manufacture of intraocular lenses is accordingly especially pronounced in cases when refractive-diffractive power correction is combined.

It is therefore an aspect of the present invention to provide a coating for the optical part of intraocular lenses for protection during certain processing steps, and especially during the tumbling/finishing process. The protection is achieved by applying a removable coating on the optical part of the lens surface, which coating is essentially stable during the tumbling polishing phase and optionally also the milling phase and which is removable from the lens surface after the process. "Stable" in this connection does not exclude the possibility that some amount of the coating may be removed during the processing steps, but the essential feature is that a layer of sufficient thickness remains for protecting the surface. This means that only a thin layer of an essentially insoluble coating substance with good adherence to the lens surface is required while it is possible to compensate for limited loss of the coating to some degree by applying a somewhat thicker layer of the coating material.

The protecting layer can be applied to the optical part after this part has received the desired optical characteristics, refractive and/or diffractive power for mono focal as well as bi- or multifocal function, or it can be present also during one or more of the processing steps creating the optical part. This means that in the present patent application, protection of the optical part of the lens, is also meant to include situations when a lens blank, a semi-IOL product, is treated in order to protect a surface that will be an optical part of the final lens.

In one aspect of the invention the haptic area and the optical part, consisting of a diffractive pattern at least on one side of the lens, are formed in one production step in a moulding process at appropriate temperature and pressure with the help of accurately machined moulds creating the required optical shapes, surfaces and diffractive patterns. The diffractive pattern is there-after covered by a protective material with controlled solubility or removability.

After the desired haptic shape has been formed from the haptic area and tumbling/polishing carried out in a polishing solution the conditions are modified so that the coating is dissolved or removed. In one embodiment the polishing solution is water based and the coating becomes soluble when pH of the polishing solution is changed to be in a certain range. It has been found that at least in certain systems the coating is most effectively removed by subjecting the lenses in such an appropriate medium to polishing conditions for a period sufficient for removal of the coating but short enough to avoid mechanical damage of the diffractive pattern.

Examples of pH sensitive protective coatings include for instance acrylic copolymers containing various amounts of carboxylic acid groups, which are soluble in a basic solution and insoluble in an acidic solution. Examples of such polymers are various copolymers containing anionic monomers such as e.g. methacrylic acid, acrylic acid, styrenesulfonic acid, sulfoethyl methacrylate, maleic acid and its anhydride, fumaric acid, various amino acids, vinyl phosphate and vinylphosphonic acid. The coating and tumbling are accordingly made under acidic conditions and the coating removal step is carried out under basic conditions. This system works very well in connection with lenses made of PMMA, which are stable under acidic as well as basic conditions. An alternative is to use a substance which is soluble under acidic conditions and insoluble under basic conditions. Examples of polymers having this property may contain cationic monomers such as dimethylaminoetyl methacrylate, trimethylammonio ethylmethacrylate chloride, aminoethyl methacrylate, aminoethyl acrylate, aminostyrene, vinylpyridine, various amino acids and other amines (including polyvinylamine). Polymers such as copolymers containing various amounts of amine containing monomers are examples of such substances.

In another embodiment of the invention a protective substance is applied which is stable during the tumbling and polishing phase, but is soluble and removable under the influence of a suitable solvent. The solvent at least partly dissolves or softens the coating to cause it to detach from the lens surface. Examples of suitable solvents are elastomers e.g. styrene butadiene rubber.

In a third embodiment of the invention the protective coating is prepared from a thermoreversible gel. The gel or substance is stable and has a protective function at the temperature used during the tumbling and polishing phase but is made soluble or swellable by changing the temperature to a different value. Typical representatives of this kind of material are poly (ethylene oxide) based copolymers, several carbohydrate based materials and substituted poly(acrylamides), e.g. poly(N-isopropyl acrylamide).

In yet another aspect of the invention a protective substance is chosen which dissolves or swells by the action of reactive chemicals, various salts or irradiation. One such group of reactive substances would be unsaturated polymers, which can be made water-soluble by the action of oxidative treatment. Examples from this group are carbohydrates, isoprene/butadiene polymers, poly anhydrides and hydrolysable polyesters.

The method of protecting the appropriate surface of the lens (or lens blank as mentioned above) includes the steps of (i) preparing a solution with suitable viscosity and drying characteristics of the protecting substance, (ii) thoroughly cleaning at least the optical part of the lens so that the coating effectively adheres to the surface and (iii) applying a desired amount (for instance a couple of drops) of the coating solution on the lens surface so that the optical part to be protected is efficiently covered. It need not to be said that one should avoid applying the solution to other parts of the lens, for instance the peripheral edge, which need to polished.

It is important that the protective coating on the lens surface be removed completely since even minor amounts of coating left on the lens surface might influence vision and/or biocompatibility. In order to check the surface for the existence of impurities, ESCA (electron spectroscopy for chemical analysis) and SIMS (secondary ion mass spectroscopy) have been found to be of great importance.

The invention, which is related to an improvement of the method for production of intraocular lenses and comprises the steps of (i) applying to the optical part of the lens a coating to protect the surface during one or more processing steps, which are carried out under conditions so that the coating is essentially insoluble and remains adhered to the lens, and (ii) removing the coating by changing the conditions which make the coating adhere to the lens, will now be illustrated by the following non-limiting examples.

EXAMPLE 1

The optical surface of some PMMA lenses were coated with a SBR-latex solution (carboxylated styrene/butadiene rubber, Dow Chemical) by applying a few drops on each side of each lens with subsequent drying. The lenses were then tumbled in a barrel containing a mixture of polishing agents normally used in IOL production. After the tumbling and polishing procedure the coating was removed by immersing some of the lenses in a bath containing a mixture of ethyl alcohol and water (1:1) at 40° C. for about two hours, and in a parallel experiment some of the lenses were immersed in a bath containing the very lipophilic solvent cyclohexane for about 5 minutes. The protective coating in both cases detached from the lens surface and could easily be removed.

EXAMPLE 2

The surface of an IOL manufactured from PMMA was coated with an Eudragit dispersion (L30D, 30%, Röhm Pharma) containing 1% polyethylene oxide 400 (PEG 400) by applying a few drops on both sides of the lens with subsequently drying at room temperature. The addition of PEG was found to further increase the mechanical properties of the coating. A set of lenses treated this way were then tumbled in a barrel using standard polishing agents. The pH value of the polishing agent was adjusted to about 1.5 by adding HCl. The coatings were removed (decapping) after the tumbling procedure by immersing the lens in a bath of pH 11 or higher.

The cosmetic appearance and the optical quality of the lenses subjected to the procedures described above were clearly improved compared to the appearance and quality of lenses tumbled the traditional way without a protecting layer.

The surfaces of lenses treated according to Example 1 and 2, respectively, were analyzed by using ESCA (Electron Spectroscopy for Chemical Analysis), which is a highly sensitive method for studying surfaces. The lenses of Example 2 were found to be very clean while the lenses from Example 1 required further washing to pass the ESCA test. It should be noticed that since this method has a very low detection limit the results demonstrate that IOL's with surfaces protected in accordance with the present invention are extremely well suited for implantation in the human eye. The method of Example 2 is the at present preferred embodiment of the invention.

We claim:

1. A method for treating an intraocular lens, said intraocular lens comprising an optical part and a non-optical edge portion surrounding said optical part and said non-optical edge portion having undesirable irregularities, which method comprises
   (a) applying a coating to said lens to cover one or both sides of the optical part of said lens while maintaining said non-optical edge portion having undesirable irregularities free of said coating,
   (b) tumbling said partially coated lens in a slurry containing polishing agents to remove said undesirable irregularities from said non-optical edge portion while leaving said optical part of said lens covered with said coating,
   (c) completely removing said coating from said optical part of said lens at the conclusion of said tumbling step (b) and prior to the time that the lens is placed in an eye.

2. A method according to claim 1, wherein a solubility of said coating is pH dependent.

3. A method according to claim 1, wherein said coating consists of a material that is thermoreversibly soluble.

4. A method according to claim 1, wherein said coating is removed by dissolution on swelling by a solvent.

5. A method according to claim 1, wherein said coating is removed by dissolution by an action of a chemical reagent.

6. A method according to claim 1, wherein said coating is removed by means of irradiation.

* * * * *